March 11, 1952 — W. A. ADAMS — 2,588,455
FOLDING BOX
Filed June 28, 1948 — 5 Sheets-Sheet 1
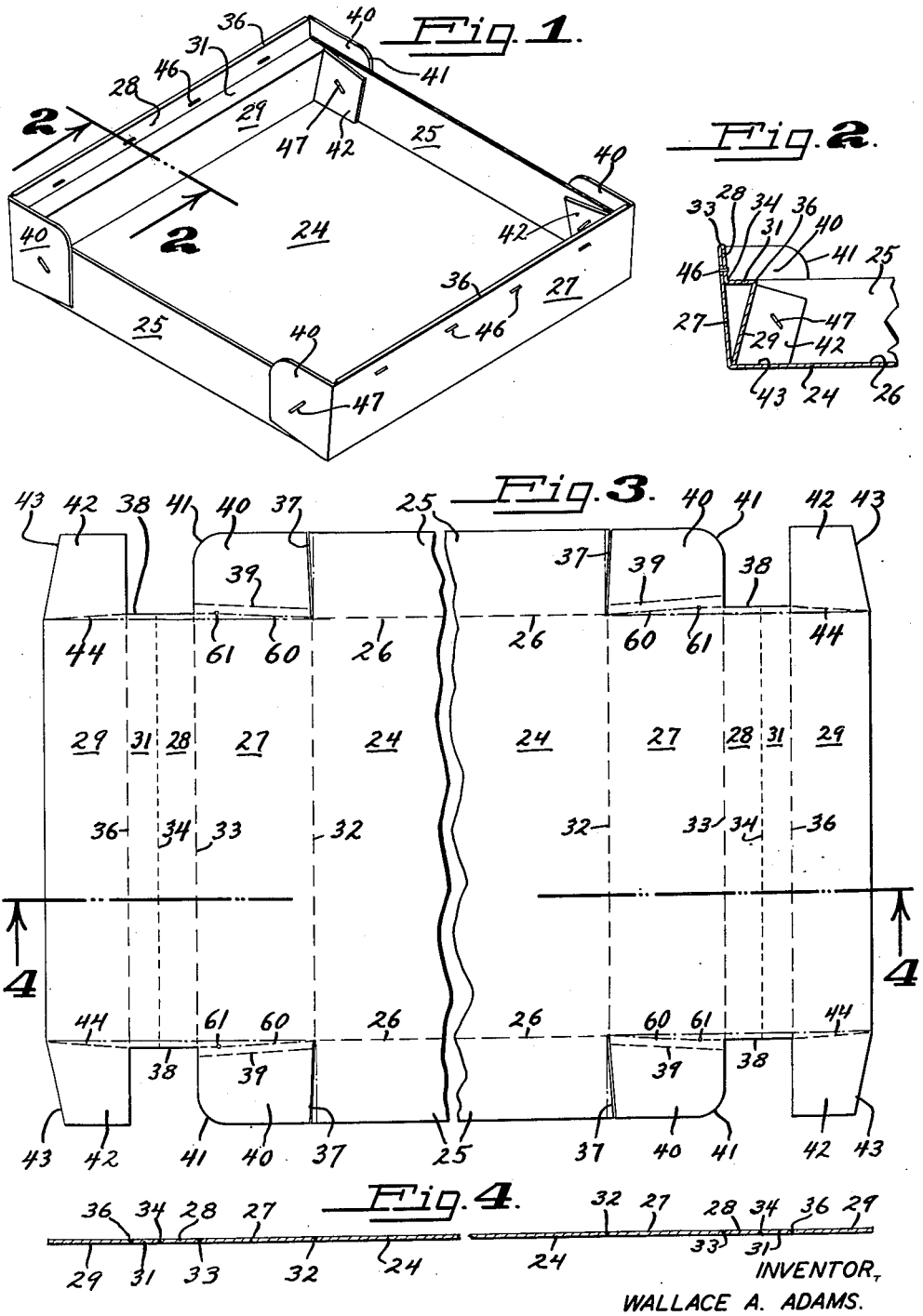
INVENTOR,
WALLACE A. ADAMS.
BY Stephen Townsend
ATTORNEY.

March 11, 1952 W. A. ADAMS 2,588,455
FOLDING BOX
Filed June 28, 1948 5 Sheets-Sheet 2
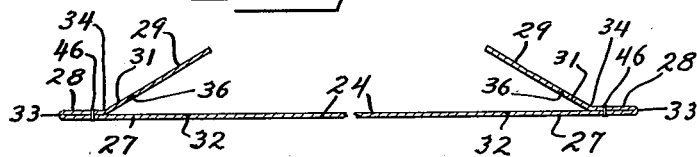
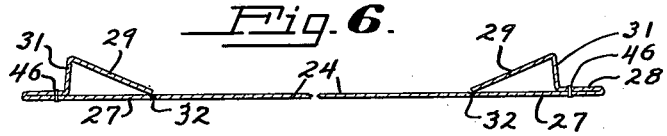
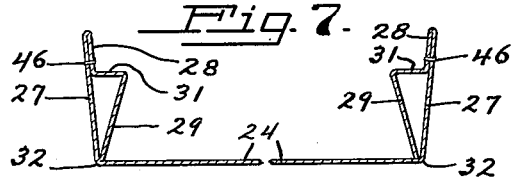
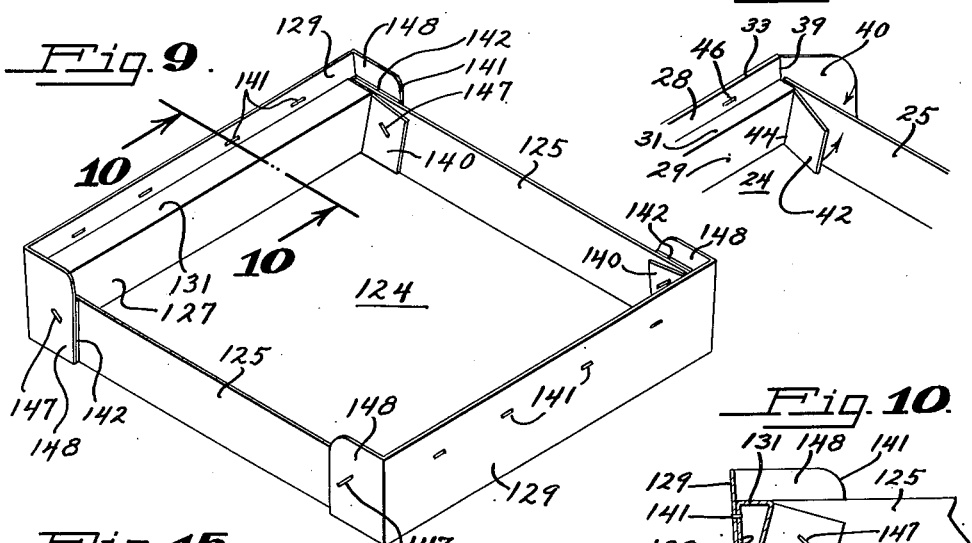
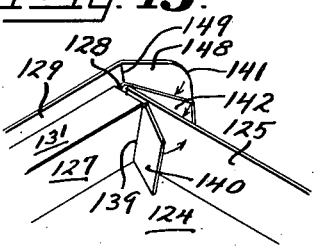
INVENTOR,
WALLACE A. ADAMS.
BY
Stephen S. Townsend
ATTORNEY.

March 11, 1952 W. A. ADAMS 2,588,455
FOLDING BOX
Filed June 28, 1948 5 Sheets-Sheet 3
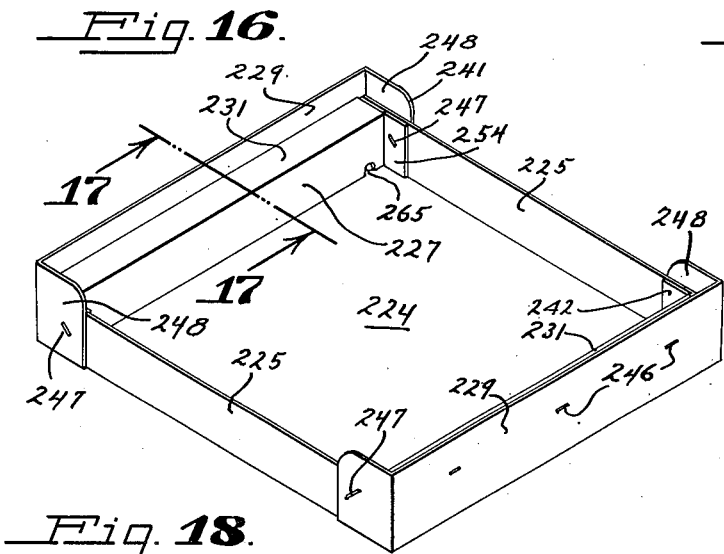
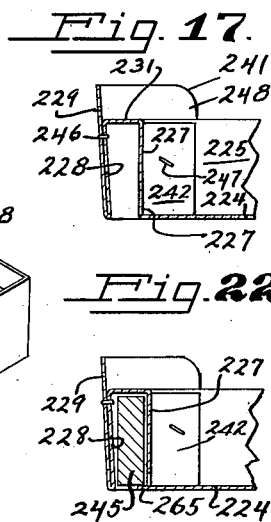
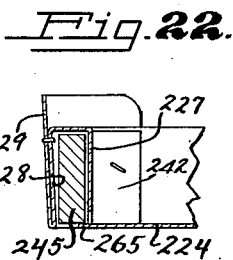
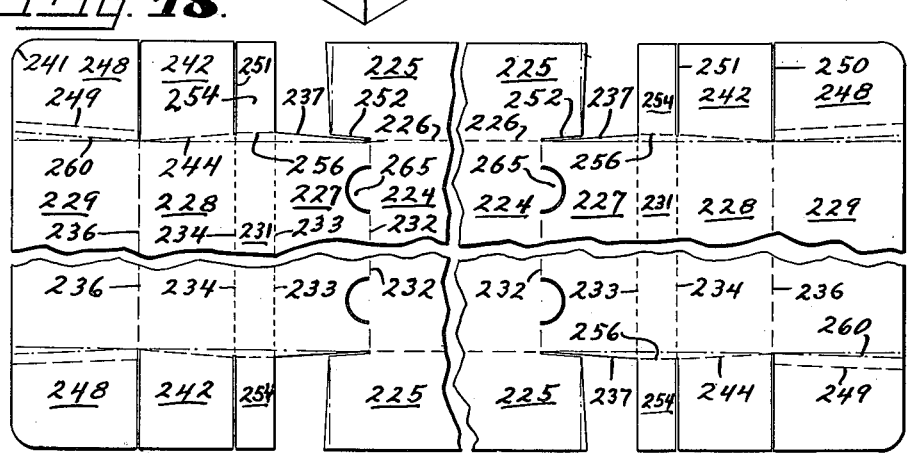
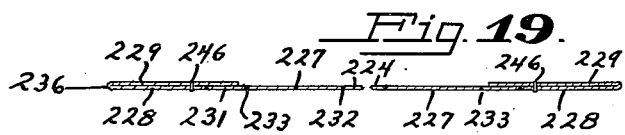
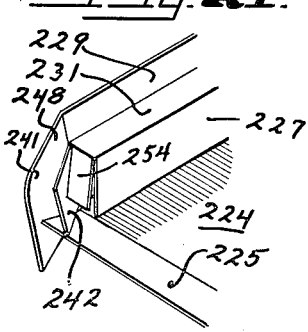
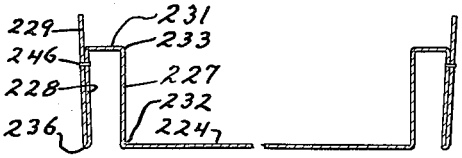
INVENTOR,
WALLACE A. ADAMS.
BY
Stephen S. Townsend
ATTORNEY.

March 11, 1952 W. A. ADAMS 2,588,455
FOLDING BOX
Filed June 28, 1948 5 Sheets-Sheet 4
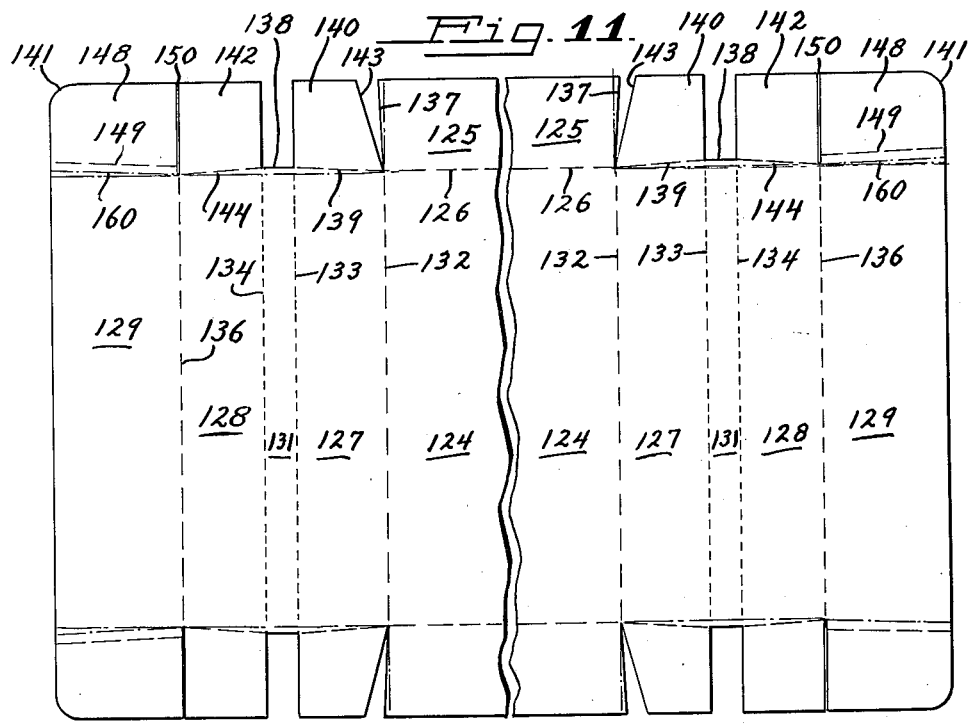
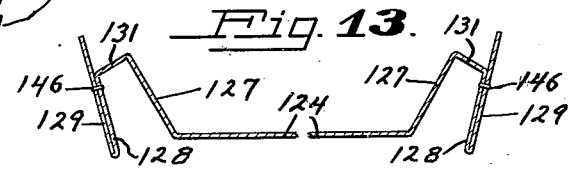
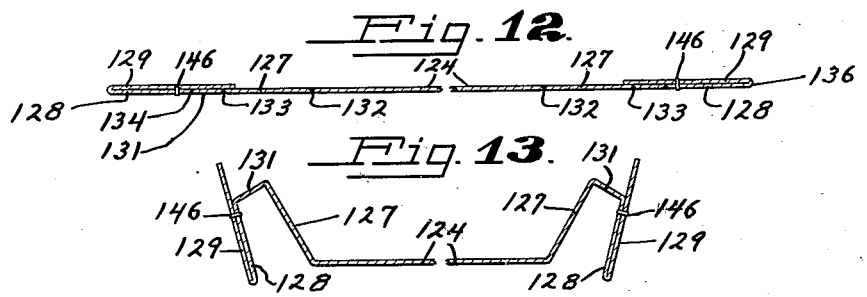
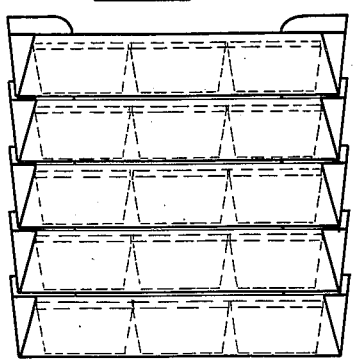
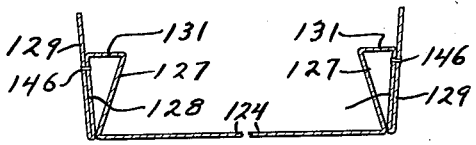
INVENTOR,
WALLACE A. ADAMS.
BY
ATTORNEY.

March 11, 1952  W. A. ADAMS  2,588,455
FOLDING BOX
Filed June 28, 1948  5 Sheets-Sheet 5

INVENTOR,
WALLACE A. ADAMS.
BY Stephen S. Townsend
ATTORNEY

Patented Mar. 11, 1952

2,588,455

UNITED STATES PATENT OFFICE 2,588,455

FOLDING BOX

Wallace A. Adams, Petaluma, Calif.

Application June 28, 1948, Serial No. 35,644

16 Claims. (Cl. 229—34)

This invention relates to folding boxes and more particularly to improvements in folding boxes constructed so that after the boxes are filled with contents they may be stacked upon one another above the level of the contents therein, and whereby each box supports the boxes stacked thereabove.

One of the principal objects of the invention is the provision of a box made of a one-piece blank having a substantially horizontally disposed shelf or ledge forming a support for a super-imposed similar box so that a plurality of boxes may be nested together each supporting the boxes above without crushing or otherwise damaging the boxes or contents of the boxes.

Another object of the invention is the provision of such a box in which the dimensions of the bottom of the box are slightly less than the dimensions of a plane along the horizontal surfaces of said ledges bounded by the upstanding ends and sides of said box, so that the bottom of one box may nest within and be supported by the ledges of the box immediately therebelow.

A further object of the invention is the provision of a box of great strength made of a single blank and having at each of the end sections thereof a plurality of thicknesses of material so as to make the box highly resistant to endwise shock or impact, thus protecting the box and its contents from damage which would otherwise result from the imposition of such forces.

Another of the objects of the present invention is the use of a plurality of layers of material at the side walls of the box as a further cushioning against shock or impact, particularly when such force is applied sidewise. The plurality of layers of material herein mentioned may occur only adjacent the corners of the box, or, as a modification of the invention, the entire sidewall of the box may consist of a plurality of layers.

Still another object of the invention is the provision of such a box which may be easily and speedily manufactured and assembled without any waste of material or labor.

A further object of the present invention is to provide a box constructed to carry a very considerable load occasioned by the stacking of filled similar boxes thereupon.

Another object of the present invention is to provide a light weight folding box which is sturdy of construction.

A further object of the present invention is to provide a folding box which may be manufactured in blank form and shipped to a situs of use, whereupon the blank may be folded speedily with relatively unskilled labor to form the completed box.

Further objects and advantages of the present invention will become apparent upon referring to the specification and accompanying drawings in which similar characters of reference represent corresponding parts in the several views.

The drawings illustrate several related modifications of the invention, Figs. 1 to 8, inclusive, illustrating one such modification; Figs. 9 to 15, inclusive, illustrating a second such modification; and Figs. 16 to 22, inclusive, illustrating still another modification; Figs. 25 to 27 showing another modification; and Figs. 28 to 30 another modification, and Figs. 31 and 32 illustrate another modification.

Referring to said drawings:

Fig. 1 is an isometric view of a single end wall, single side wall, inclined leg assembled box.

Fig. 2 is a fragmentary sectional view taken on line 2—2 of Fig. 1.

Fig. 3 is a plan view of a blank utilized to assembly of the box shown in Fig. 1.

Fig. 4 is a sectional view taken on line 4—4 of Fig. 3.

Figs. 5, 6 and 7 are sectional views showing the steps in assembly of a completed box of the character illustrated in Fig. 1.

Fig. 8 is an isometric view of a corner of the box shown in Fig. 1 and illustrating the positioning of the end flaps.

Fig. 9 is an isometric view of a double end wall, single side wall, inclined leg assembled box.

Fig. 10 is a fragmentary sectional view taken on line 10—10 of Fig. 9.

Fig. 11 is a fragmentary sectional view of the double end wall, single side wall, inclined leg assembled box shown in Fig. 9.

Figs. 12, 13 and 14 are sectional views showing the steps in assembly of a completed box of the character illustrated in Fig. 9.

Fig. 15 is an isometric view of a corner of the box shown in Fig. 9 and illustrating the positioning of the end flaps.

Fig. 16 is an isometric view of a double end wall, single side wall, vertical leg assembled box.

Fig. 17 is a fragmentary sectional view taken on line 17—17 of Fig. 16.

Fig. 18 is a plan view of a blank utilized to assemble the box shown in Fig. 16.

Figs. 19 and 20 are sectional views showing the steps in assembly of a completed box of the character illustrated in Fig. 16.

Fig. 21 is an isometric view of a corner of the box shown in Fig. 16 and illustrating the positioning of the end flaps.

Fig. 22 is a view similar to Fig. 17 and showing the insertion of a reinforcing member in the end wall section of the box.

Fig. 23 is a diagrammatic view showing a plurality of boxes in nested position and indicating the supporting function of the shelves, berry boxes or the like are illustrated in broken lines.

All the various modifications described herein have certain important features in common and all may be said to constitute improvements over my prior Patent No. 1,826,197.

Figure 24:
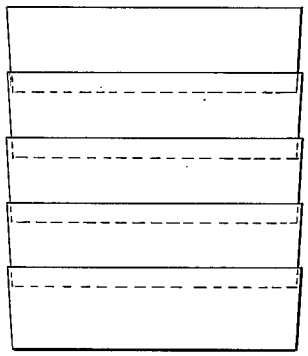
Fig. 24 is an end elevational view of the boxes shown in Fig. 23, and showing shelves in broken lines.

It is noted that the box described herein is particularly useful in shipping perishable goods, such as, for example, berries, fresh cut flowers and a multitude of other similar products which must be carefully protected against bruise or other injury during shipment and storage. Of course, the present invention is also useful in packaging many other products, such as glassware and similar frangible articles and other articles and products. Thus, it will be seen that all of the boxes consist of a rectangular flat bottom with upstanding sides and ends, the sides and ends inclining outwardly to a degree, and both of the end sections including a horizontally disposed ledge thereacross on which the bottom of another box may rest so that the boxes may be nested together in a stack as shown in Figs. 23 and 24. It will also be observed that each of the boxes is formed of an integral blank and that each of the end sections and each of the sides adjacent the corners of each of the boxes consists of a plurality of layers of material so as to be resistant to impact or shock. Although, for purposes of clarity of exposition, each of the modifications will be separately described, it will be understood that the modifications have common features constituting a single invention.

The box illustrated in Figs. 1 to 8, which may be termed a "single-fold, single side wall, inclined leg" box, is fashioned of a blank of corrugated paper or similar strong material, the ribs of the corrugated material preferably extending longitudinally of the blank, and has a rectangular bottom portion 24 and side portions 25 which may be folded at a slightly obtuse angle thereto along longitudinal score lines 26, said score lines facilitating subsequent folding therealong as is well understood in this art. An end section consisting of three end portions, 27, 28 and 29, respectively, and shelf or ledge portion 31 is formed at each of the ends of the blank, separated one from the other by transverse score lines as follows: The transverse score line 32 divides the first end portion 27, sometimes refered to herein as leg member 27, from the bottom portion 24; second transverse score line 33 divides first end portion 27 from second end portion 28; third transverse score line 34 (on the obverse surface of the blank) divides second end portion 28 from shelf portion 31; and fourth transverse score line 36 divides shelf portion 31 from the third or outermost end portion 29. Thus, proceeding outwardly from the bottom portion of the blank, the order of the parts is as follows: Bottom portion 24, first end portion 27, second end portion 28, shelf or ledge portion 31, and third end portion 29, each said portion being separated from the adjacent one by a transverse score line. It will further be seen that the longitudinal dimension of end portion 27 is the greatest and of end portion 28 is the least.

In order that the sides and end portions of the box may, in assembled relationship, have the desired degree of angularity with respect to the bottom of the box to facilitate nesting of one box on top of the other, and in order that the folding operations may be accomplished quickly and surely and without it being necessary to deform the corrugated material in order to make the parts fit together, certain knife cuts and score lines are made in the blank, as is next described. For purposes of illustration, it will be assumed that the corrugated material of which the blank is made has a thickness of ⅛ inch and that the height of end portion 27 is 4 inches and of end portion 28 is 1 inch. It is further assumed that the side walls of the box are to measure 3 inches. The assumed dimensions will produce a ledge or shelf approximately level with the tops of the side walls when the box is folded into operative position.

A knife cut or slit 37 is formed in the blank having its inward terminus at the intersection of lines 26 and 32, said cut 37 being not quite perpendicular to line 26 but inclining toward the end of the blank so that at its intersection with the margin of side 25 it is displaced outwardly ⅛ inch from what would be the projection of line 32 to its intersection with said margin, the ⅛ inch offset being equivalent to the thickness of the material of the blank. The consequent outward flaring of the edges of side 25 ultimately assists in imparting the proper obtuse angle of end portion 27 with respect to bottom 24, as is shown particularly in Fig. 2, all as will hereinafter appear.

Another knife cut 38 is formed in the blank, said knife cut being parallel to but offset outwardly ⅛ inch with respect to the projection of line 26 and defining the margins of end portion 28 and shelf portion 31. The knife cut 38 from its intersection with lines 33 and 36 extends toward the transverse margins of the blank at right angles so as to form first end flap 40 and second end flap 42. The corner of first end flap 40 is rounded off, as at 41, so as to eliminate an upstanding sharp corner in the completed box, which might otherwise snag or be bent over and thereby prevent proper nesting.

A score line 39 is also formed on end flap 40, and the location of said line preliminarily involves location of an imaginary reference line shown on the drawings and designated by numeral 60, said reference line being, in turn, dependent upon location of point 61. In coordinating point 61, it will be observed that said point is spaced ⅛ inch outward from the projection of line 26 (i. e. on the projection of knife cut 38) and 1 inch inward from the intersection of cut 38 with line 33 (assuming end portion 28 to have a height of 1 inch). Line 60 is then drawn from the common intersection of lines 26, 32 and 37 to point 61 and then bent to extend parallel to the projection of line 26 to the intersection of cut 38 with line 36.

Score line 39 which is straight throughout its length is then drawn parallel to that portion of line 60 which extends from the intersection of lines 26, 32 and 37 to point 61, but line 39 is offset outwardly with respect to line 60 by ¼ inch (i. e. twice the thickness of the blank). Thus, foldable end flap 40 is bounded by knife cut 37, score line 39, knife cut 38 and the transverse margin of the blank.

Score line 44 is formed to define second end flap 42. Line 44 extends from the intersection of cut 38 and line 36 to the intersection of the projection of line 26 with the longitudinal margin of the blank. Flap 42 is beveled off at 43 adjacent the longitudinal margin of the blank to form a beveled edge for the purpose of assisting in positioning the end portions and shelf portion in proper angular relationship as will hereinafter appear. The angle of said beveled edge 43 with respect to the projection of line 26 is equal to the angle which end portion 29 assumes with respect to the bottom of the box when completely assembled. In such assembled position, end portion 29 constitutes a support or leg for the inner edge of shelf 31.

Existing machinery may be used to fashion the blank, having dies which make the knife cuts, slits and score lines as is well understood in the art. Further, the various folding and stapling steps which are next described may be performed by existing machinery or manually.

The steps in making the transverse folds of the blank are illustrated in Figs. 5, 6 and 7. The first step in making the transverse folds is illustrated in Fig. 5, second end portion 28 being folded upwardly and flat against first end portion 27 along score line 33, and these portions are permanently stitched in such position by a plurality of fasteners 46, such as common wire staples. These steps may be performed at the factory, and the blanks shipped flat to the user who may then perform the additional folding and stitching operations herein described. As also shown in Fig. 5, the ledge portion 31 is bent upwardly at an angle with respect to second end portion 28 along the line 34.

As shown in Fig. 6, the next step in assembling the box is to fold the third end portion 29 downwardly along the line 36 so that the margin of end portion 29 overlies score line 32. Next, as is shown in Fig. 7, first end portion 27 is bent upwardly along line 32, thus completing the folding operations insofar as the transverse score lines are concerned. The sides 25 may then be folded upwardly along score lines 26.

The remaining folding operations have to do with the end flaps 40 and 42 which are folded along score lines 39 and 44, respectively, and fit at the corners as is shown in Fig. 8, second flap 42 fitting inside side 25 and against the inner surface thereof and first flap 40 fitting outside side 25 and against the outer face thereof. The edge of side 25 fits flush against the inner surface of end portion 27 so as to determine the obtuse angle of portion 27 with respect to bottom 24. Each corner is held together by a single staple 47 which goes through flap 40, side 25 and flap 42 and holds all three together. It will be seen that the offsetting and angular position of the score lines 39 and 44 with respect to score line 26 permits the fitting of the flaps together without buckling the blank or otherwise distorting the same to secure proper folding and angularity of the flaps, ends and sides. The purpose of bevel 43 also now appears, for the beveled edge is fitted so that it lies along the bottom of the box and this relationship of the edge 43 when the outer margin of end portion 29 overlies line 32 positions end portion 29 at an acute angle with respect to bottom 24, assists in positioning shelf 31 horizontal, and also in positioning first end portion 27 at a proper obtuse angle with respect to bottom 24, all as shown in Fig. 2. Hence the horizontal dimensions of the box are greater along the horizontal plane of the surface of shelf 31 than are the dimensions of bottom 24, and this feature permits nesting of one box on top of the other as illustrated in Figs. 23 and 24. Flaps 40 and second end portions 28 projecting upwardly from said plane of ledges 31 prevents horizontal shifting of the nested boxes with respect to each other.

Since shelf portion 31 of the assembled box is disposed substantially horizontally and is supported by leg 29, it provides a stop or rest for the bottom of a superimposed box. The shelves also may accommodate a rectangular cover for the box which may rest thereupon. In any case, the ledges prevent superimposed boxes or covers from crushing the contents of the boxes therebeneath. It will also be noted, particularly with reference to Fig. 2 that the ends of the box actually consist of two thicknesses of corrugated paper and thus cushion against endwise thrust, shock or impact. This feature is desirable when easily bruised perishables or breakable frangible articles must be shipped in trucks or freight cars, the repeated stopping and starting of which causes the boxes to shift endwise. By placing the ends of the boxes of the present invention pointing toward the front and rear of the vehicle the damage to boxes and contents which ordinarily results from such shifting is minimized. Further, it is apparent that there are three thicknesses of material at the sides adjacent the corners of the box, which feature assists in cushioning against sidewise thrust, shock or impact.

The modified box shown in Figs. 9 to 15, inclusive, may be termed a "double fold, single sidewall, inclined leg" box, and the principal difference between this box and the "single fold" box may be best seen by comparison of Fig. 10 with Fig. 2, whereby it will be noted that, whereas in the first modification there are two thicknesses of corrugated paper throughout each end, in the second modification there are three thicknesses at the ends. The latter construction requires more material for a box of the same capacity, but the advantages of the triple ends are in extra strength and additional cushioning against shock.

The double fold box is made of a blank shown in plan in Fig. 11. Differences in the assembly of the box necessitate a somewhat different layout of the blank as compared with the single fold box, but it may be noted that the order of positioning of the parts, proceeding outwardly from the bottom portion 124 toward an end of the blank is: bottom portion 124, first end portion 127 sometimes referred to as leg member 127, shelf portion 131, second end portion 128, and third end portion 129, and that each such portion is separated from its adjacent portion by a transverse score line, such lines, proceeding in the same order being numbered 132, 133, 134 and 136 (lines 133 and 134 being on the obverse surface of the blank). Side portion 125 adjoins bottom portion 124 with longitudinal score line 126 interposed therebetween.

The various knife cuts and score lines defining the end flaps and sides 125 are angularly disposed as hereinafter described for the purpose of affording the desired angularity of the ends and sides with respect to the bottom in a manner somewhat similar to these same features of the single fold box, but with certain differences which will appear. First end flap 140 is separated from side wall 125 by a trianglar knife cut 137, as shown in Fig. 11. The apex of said cut is at the intersection of lines 132 and 126 and the side which defines the edge of side 125 flares outwardly so as to intersect the longitudinal margin of the side 125 at a point ⅛ inch offset outwardly with respect to the intersection of the projection of line 132 with said margin. The other side of triangular knife cut 137 provides a beveled edge 143 for end flap 140, and the angle between said edge 143 and the projection of line 126 is equal to the angle which end portion 127 assumes with respect to the bottom 124 when the box is assembled as in Fig. 10.

Shelf portion 131 is not provided with a flap, but is cut off by knife cut 138, said cut being offset outwardly from the projection of line 126 by ⅛ inch and disposed parallel thereto. The other two sides of cut 138 are perpendicular to line 126 and define the opposed edges of flaps 140 and 142.

Another knife cut 150 is interposed between second end flap 142 and third end flap 148, said cut constituting an extension of line 136 and extending inwardly from the margin of the blank to intersect with the projection of line 126.

Each of the end flaps 140, 142 and 148, the same being associated with end portions 127, 128 and 129, respectively, is provided with a score line on which it may be folded. Score line 139 for flap 140, commences at the common intersection of lines 126, 132 and 137 and extends to the intersection of line 134 with cut 138, or, in other words, its outer extremity is offset outwardly ⅛ inch with respect to the projection of line 126. Score line 144 for flap 142 commences at the intersection of cut 138 with line 134 and extends to the intersection of line 136 with the projection of line 126, i. e. the bottom of slit 150. The location of score line 149 for flap 148 requires, as a preliminary matter, the location of imaginary reference line 160, said reference line commencing at the intersection of line 136 with the projection of line 126 and extending to a point on the longitudinal margin of the blank offset outwardly ⅛ inch from the point of intersection of the projection of line 126 with said margin. Score line 149 is then parallel to but offset outwardly with respect to reference line 149 in the amount of ¼ inch. The outer corner of flap 148 is rounded off as at 141 similar to the rounded corner 41 of the single fold box and for the same purpose.

The use of flap 142 is optional. If desired, end portion 128 may be cut off at line 144 so that line 144 becomes a cut line instead of a score line. In that event, line 149 may be offset with respect to reference line 149 by ⅛ inch.

The steps in making the transverse folds are plainly shown in Figs. 12, 13 and 14, and the assembly of the end flaps as illustrated in Fig. 15, wherein it is seen that the flap 140 fits inside the side portion 125, flap 142 fits outside said side portion and flap 141 is outermost. The edge of side portion 125 fits flush against end portion 128. Staples 146 and 147 hold the folds together. The drawings may be referred to in lieu of verbal description of the assembly operation. It will be understood that the blank may be folded as shown in Fig. 12 at the factory and shipped to the user flat in such form in order to save shipping space.

The completed box has substantially horizontal shelves 131 at either end on which the bottom of a superimposed box may rest, and the ends 129 and upstanding flap 141 restrain horizonal movement of the nested boxes with respect to each other. It is further apparent that the ends and sides incline outwardly upwardly so that the dimensions of the box in the plane of the shelves is slightly greater than the dimensions of the bottom and the boxes may nest.

The "double fold, single side wall, vertical leg" box illustrated in Figs. 16 to 21, inclusive, is quite similar in construction to the double fold box just described, but differs in that the legs are substantially vertical instead of inclined, although the boxes nest adequately, and in that two of the three end portions are parallel and quite widely separated. This difference in construction is best shown by comparison of Fig. 17 with Figs. 2 and 10. The space between the separated end portions may be partially filled by blocks 275, as shown in Fig. 22, which blocks transmit some of the load of superimposed boxes and hence permit nesting of a greater number of boxes in a vertical stack or placing of a heavier load in the boxes. This box requires more material for its manufacture than the types already described, but is considerably more resistant to endwise shock.

The blank for such a box is shown in plan in Fig. 18. It will be observed that the side portions 225 do not terminate at extensions of score line 232 but project longitudinally beyond said score line and that the first end portion or supporting leg member 227 does not have an end flap but is cut away as at 238, whereas shelf portion 231 has an end flap 254.

The bottom 224, first end portion 227, shelf portion 231, second end portion 228 and third end portion 229 are generally similar to the corresponding portions of the double fold box. The important differences are in the end flaps and sides 225. As has been stated, side 225 projects longitudinally beyond the projection of line 232, the amount of such projection being equal to the width of the shelf 231. The projecting edge of said side 225 is angularly disposed, being offset longitudinally ⅛ inch more at the top than at the bottom. Knife cut 252 commences at the intersection of lines 232 and 226 and is angularly disposed so that the intersection of its projection with line 233 is offset outwardly ⅛ inch and said knife cut separates the projecting ear of side 225 from the adjoining first end portion 227. Knife cut 237 is a three-sided cut: One side defines the projecting edge of side 225 as has already been discussed; another side or bottom side is a projection of cut 252 from the point of its termination to the point of its intersection with line 233; its third side commences at said last named point and extends perpendicular to the projection of line 226 to the transverse margin of the blank.

Knife cut 251 separates shelf flap 254 from end flap 242 and is an extension of line 234, extending inwardly from the margin of the blank to a point on line 234 offset outwardly from the projection of line 226 in the amount of ⅛ inch.

Knife cut 250 separates end flaps 242 and 248 and is an extension of line 236, extending inwardly from the margin of the blank to the intersection of line 236 with the projection of line 226.

The score lines for the end flaps have the same function as in the other types of boxes. Score line 256 for shelf flap 254 is parallel to but offset outwardly ⅛ inch from the projection of line 226. Score line 244 for end flap 242 commences at the bottom of slit 251 (i. e. a point on line 234 offset outwardly ⅛ inch from the intersection with the projection of line 226) and slants to the bottom of slit 250 (i. e. the intersection of line 236 with the projection of line 226). The location of score line 249 for flap 248 requires the preliminary location of imaginary reference line 260. Line 260 commences at the bottom of slit 259 and slants outwardly to a point on the longitudinal margin of the blank offset outwardly from the intersection of the projection of line 226 with said margin by ⅛ inch. Line 249 is then parallel to but offset outwardly ¼ inch from line 260. End flap 248 is also rounded off at 241 as in the previous modifications.

The use of flaps 254 and 242 is optional and lines 256 and 244 may be cut lines instead of score lines. In that event, the offset of line 249 from line 260 is ⅛ inch.

When folded, as illustrated in Figs. 19 and 20, end portions 227 and 228 are opposed but substantially parallel and this spacing apart of the two end portions makes the box more resistant to endwise shock. The end portions 228 and 229 are not quite vertical, but incline slightly upwardly outwardly so as to permit nesting. Fig. 21 illustrates the positioning and folding of the end flaps. Staples 246 and 247 hold the folds in permanent position.

As an additional and optional modification of the last-described box, semi-circular ears 265 may be cut into first end portion 227, the diameter of the semi-circular portion lying along score line 232. Thus, when end portion 227 is bent upward with respect to bottom 224, the ears 265 project outwardly into the space between opposed end portions 227 and 228, said ears lying in a horizontal plane. The ears may be used to retain blocks 275 in position between portions 227 and 228. The blocks take most of the vertical load of a superimposed box and hence more boxes may be nested in a stack or a heavier load may be placed in the boxes. The blocks also absorb some of the endwise shock. Such blocks may be cubical in shape and made preferably of laminated strips of corrugated paper, a piece of wood or similar materials.

It is noted that the boxes are preferably formed from corrugated paper and the ears 265 are cut therefrom transverse to the longitudinal axes of the corrugations so that said ears have strength sufficient to support blocks 275.

Figure 25:
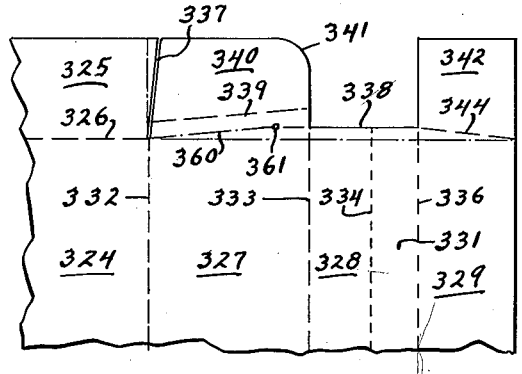
Fig. 25 is a plan view of the corner construction of a blank utilized in the assembly of a single end wall, single side wall, vertical leg box.
Figure 26:
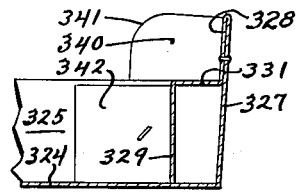
Fig. 26 is a fragmentary sectional view of the end wall of an assembled box formed from the blank illustrated in Fig. 25.
Figure 27:
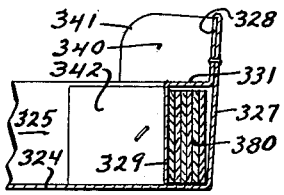
Fig. 27 is a view similar to Fig. 26 and showing insertion of a reinforcing member in the end wall section of said box.

A modification of the single-fold, single side wall box is shown in Figs. 25 to 27. Contrasting Fig. 26 with Fig. 2, it will be seen that, whereas in Fig. 2 the third side portion or supporting leg 29 is disposed at an acute angle with respect to the bottom of the box, in Fig. 26 the corresponding leg 329 is substantially vertical. The latter position is in some respects more desirable inasmuch as it results in a stronger support for shelf 331, but it will also be seen that the capacity of the box is to some extent reduced.

The only differences in the formation of the blank of Fig. 25 with respect to Fig. 3, occur in the end portion 329 and end flap 342. The height of end portion 329 is less than that of portion 29 for boxes in other respects the same, the difference being substantially that between the hypotenuse and longest leg of flap 342 is squared instead of being beveled as is edge 43 of flap 42.

As an additional modification, shown in Fig. 27 the space between end portions 329 and 327 may be filled with strips of corrugated paper 380 or a wooden block or some other strong material to furnish additional supporting strength for shelf 31 and increased cushioning against impacts for the box and contents.

Figure 29:
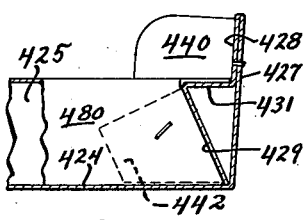
Fig. 29 is a fragmentary sectional view of the end wall of an assembled box formed from the blank illustrated in Fig. 28.
Figure 28:
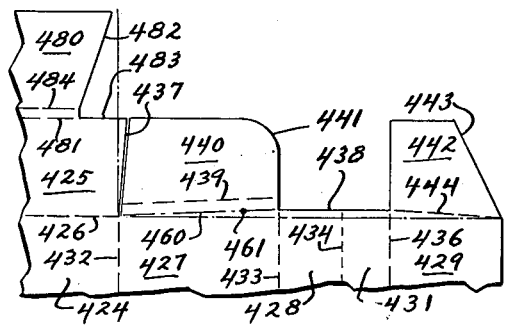
Fig. 28 is a plan view of the corner construction of a blank utilized in the assembly of a single end wall, double side wall, inclined leg box.
Figure 30:
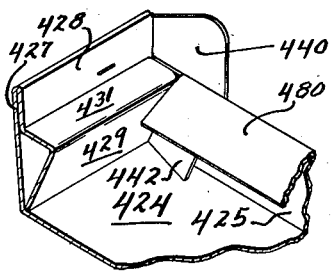
Fig. 30 is an isometric view of a corner of a box assembled from the blank illustrated in Fig. 28 and illustrating particularly the positioning of the end flaps and side walls.

In the modifications heretofore described, the side walls of the boxes have consisted of but a single thickness of corrugated material except in the region of the corners of the box, and thus the sides are weaker and afford less cushioning against shock than do the ends which have a multiplicity of layers throughout. In the modification shown in Figs. 28 to 30, a double side wall, single end fold, inclined leg type box is illustrated. The double side wall feature, described in this and in the succeeding modification, can with suitable modification be adapted to all the various types of single side wall boxes which have already been described, the modifications necessary to construct such boxes being apparent to one skilled in this art having the benefit of the disclosure of this specification.

Adjacent side portion 425 is second side portion 480 separated therefrom by longitudinal score line 481 parallel to line 426. The height of side 480 is approximately ⅛ inch less than that of side 425 so that when folded over the margin of side 480 lies along the upper surface of bottom 424. It is desirable to position a second longitudinal score line 484 parallel to and spaced ⅛ inch outwardly from line 481 so that when side 480 is folded over it will be spaced from side 425 by ⅛ inch to permit the interposition of end flap 442 if such flap is actually used. It may be mentioned that the use of flap 442 is optional, as hereinafter appears.

The longitudinal edge 482 is slanted and the angle between said edge and the projection of line 481 is substantially equal to the angle between inclined leg 429 and the bottom 424 when the box is assembled. The outward terminus of cut 482 lies on the transverse margin of the blank at a point spaced longitudinally inwardly ⅛ inch from the intersection of the projection of line 432 with the projection of said margin. Knife cut 483 is a continuation of line 481 outwardly beyond its intersection with cut 482 and extending to the intersection with cut 437. It will thus be seen that when the box is folded as in Fig. 29, edge 482 positions side 429 at the proper angle with respect to the bottom of the box and hence that flap 442, the edge 443 of which performs a similar function, may be dispensed with. The longitudinal edge of side 425 formed by knife cut 437 positions end portion 427 at a proper obtuse angle with respect to the bottom 424.

In assembling the sides, side 425 is folded upwardly along line 426 and side 480 is then folded down along line 481, the edge 482 lying against end 429 and assisting in securing it in position. The outward flaring of the sides and ends is in all other respects similar to the previous modifications, and since side 480 is folded inside side 425, the nesting of the boxes is not impeded.

Figure 31:
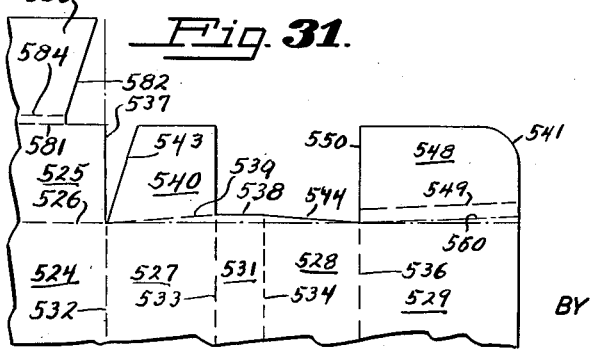
Fig. 31 is a plan view of the corner construction of a blank utilized in the assembly of a double end wall, double side wall, inclined leg box.
Figure 32:
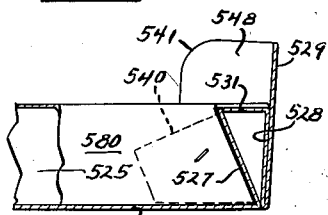
Fig. 32 is a fragmentary sectional view of the end wall of an assembled box formed from the blank illustrated in Fig. 31.

Figs. 31 and 32 show an additional modification, the same being a double fold, double side wall, inclined leg box. This box is similar to that shown in Figs. 9 to 15, except for the double side wall feature. It will also be seen that the flap corresponding to flap 142 has been eliminated in this modification and in that connection it should be mentioned that the use of flap 540 shown in the drawings is optional for the reason that the positioning of end portion 527 at a proper angle with respect to the bottom of the box when assembled is accomplished by the angularity of edge 582 and hence the edge 543 of flap 540 is not essential to that positioning.

The positions of end portions 527, 528 and 529 and shelf 531 by means of score lines 532, 533, 534 and 536 is similar to the corresponding elements of Figs. 9 to 15. Likewise end flap 548 and optional end flap 540 correspond to flaps 148 and 140, respectively. Lines 539, 538, 544 and 549 are located in a similar manner, as are lines 537, 543 and 550.

Side wall 525 is divided from bottom 524 by longitudinal score line 526 and line 581 is disposed parallel thereto with the height of second side wall 580 being ⅛ inch less than that of wall 525 so that the margin of portion 580 will fold along the bottom of the box when assembled. Optionally line 584 is located spaced ⅛ inch outwardly from and parallel to line 581 so as to leave room for insertion of flap 540, if used. The slant of line 537 with respect to the bottom of the box positions end portions 528 and 529 at the proper angle with respect to the bottom of the box when assembled, as in the forgoing modification. Cut line 582 is angled with respect to line 526 so as to locate the inclined leg 527 at the desired angle with respect to the bottom of the assembled box, such angle being shown in Fig. 32. The intersection of line 582 with the margin of the blank is offset inwardly ⅛ inch from the projection of line 532 with said margin so as to permit proper folding of the blank as mentioned in the preceding modification.

It is apparent that the double side wall feature may also be adapted to a single end fold, vertical leg box or to and double end fold, vertical leg box, if desired.

With respect to all the constructions described herein, it may be pointed out that suitable ventilating apertures may be cut in the bottom, sides and ends substantially as illustrated in my aforementioned Patent No. 1,826,197.

Score lines are illustrated in the drawing by means of broken lines. The longer broken lines indicate a score line on the top thereof while the shorter broken lines indicate a score line on the reverse side of the blank. Projection or reference lines are indicated by dot and dash lines.

It is understood that various modifications of the present invention other than those herein disclosed may be practiced by those skilled in the art within the spirit of the invention and the scope of the appended claims.

I claim:

1. A folding box comprising an integral bottom, sides, ends and substantially horizontally disposed end ledges, the length of said box in the horizontal plane of said ledges being greater than the length of said bottom and the length of said bottom being greater than the distance between the inner edges of said ledges in said horizontal plane, said ends consisting of a plurality of layers of material and having folded end flaps, one of said flaps being folded inside said side, and another of said flaps being folded outside said side, one of the edges of said inside flap abutting the bottom of the box and determining the angularity of the layer with which said flap is associated with respect to said bottom.

2. A folding box comprising an integral bottom, sides, ends and substantially horizontally disposed end ledges, the length of said box in the horizontal plane of said ledges being greater than the length of said bottom, said ends consisting of a plurality of layers of material, one said layer being folded to assume an acute angle with respect to said bottom and providing a support leg for said end ledge and another of said layers being folded to assume an obtuse angle with respect to said bottom, each of said layers having folded end flaps, one of said flaps folded inside said side and another of said flaps folded outside said side.

3. A folding box comprising an integral bottom, sides, ends and substantially horizontally disposed end ledges, the length of said box in the horizontal plane of said ledges being greater than the length of said bottom, said ends consisting of a plurality of layers of material, one said layer being folded to assume an acute angle with respect to said bottom and providing a support leg for said end ledge and another of said layers being folded to assume an obtuse angle with respect to said bottom, each of said layers having folded end flaps, one of said flaps folded inside said side and another of said flaps folded outside said side, the first-mentioned of said flaps having a beveled edge, whereby when said beveled edge is positioned along said bottom said first-mentioned layer assumes said acute angle with respect to said bottom.

4. A folding box comprising an integral bottom, sides, ends and substantially horizontally disposed end ledges, the length of said box in the horizontal plane of said ledges being greater than the length of said bottom, said ends consisting of a plurality of layers of material and having folded end flaps, one of said flaps being folded inside said side and another of said flaps being folded outside said side, one said layer being folded to assume an acute angle with respect to said bottom and providing a support leg for said end ledge and another of said layers being folded to assume an obtuse angle with respect to said bottom, one of the edges of said inside flap being positioned along said bottom, and a separate reinforcement interposed between said layers.

5. A folding box comprising an integral bottom, sides, ends and substantially horizontally disposed end ledges, the length of said box in the horizontal plane of said ledges being greater than the length of said bottom and the length of said bottom being greater than the distance between the inner edges of said ledges in said horizontal plane, said ends consisting of a plurality of layers of material and having folded end flaps, one of said flaps being folded inside said side, and another of said flaps being folded outside said side, one of said layers and one of said flaps extending above the horizontal plane of said ledges.

6. A folding box comprising an integral bottom, sides, ends and substantially horizontally disposed end ledges, the length of said box in the horizontal plane of said ledges being greater than the length of said bottom formed in folding said ends, and the length of said bottom being greater than the distance between the inner edges of said ledges in said horizontal plane said ends consisting of at least four portions with said ledge interlying two of said portions, the outer two of said portions being folded together, and fastening means holding said outer two portions in folded position, foldable end flaps connected to two of said portions, one of said flaps folded inside and another outside said side, and second fastening means holding said flaps and said side in position.

7. A folding box blank formed of a single sheet of material and having a rectangular bottom portion, at least three end portions for each end of said blank, a shelf portion for each end of said blank interposed between two of said end portions, said end portions, said shelf portion and said bottom portion being separated from one another by transverse score lines, a pair of side portions adjoining opposed edges of said bottom portion and divided therefrom by longitudinal score lines, said side portions being outwardly flared at an angle equal to that angle said outermost end portion assumes with respect to said bottom portion in an assembled box, and an end flap on the end portion constituting the outermost portion of the end of an assembled box, said flap being separated from its end portion by a score line disposed at an angle equal to the angle assumed by said side portions with respect to said bottom portion in an assembled box, a second end flap on the end portion constituting the innermost portion of the end of an assembled box, said second flap having an edge disposed at an angle with respect to said longitudinal score lines equal to the angle assumed by said last-mentioned end portion with respect to said bottom portion of an assembled box.

8. A folding box blank formed of a single sheet of material and having a rectangular bottom portion, at least three end portions for each end of said blank, a shelf portion for each end of said blank interposed between two of said end portions, said end portions, said shelf portion on said bottom portion being separated from one another by transverse score lines, a pair of side portions adjoining opposed edges of said bottom portion and divided therefrom by longitudinal score lines, said side portions being outwardly flared at an angle equal to that angle said outermost end portion assumes with respect to said bottom portion in an assembled box, and an end flap on the end portion constituting the outermost portion of the end of an assembled box, said flap being separated from its end portion by a score line disposed at an angle equal to the angle assumed by said side portions with respect to said bottom portion in an assembled box, a second end flap on the end portion constituting the innermost portion of the end of an assembled box, said second flap having an edge disposed at an angle with respect to said longitudinal score lines equal to the angle assumed by said last-mentioned end portion with respect to said bottom portion of an assembled box, said second end flap being separated from its end portion by a score line disposed at an angle equal to the angle assumed by said side portion with respect to said bottom portion in an assembled box.

9. A folding box comprising integral bottom, sides, ends, and substantially horizontally disposed shelves, each of said ends consisting of a plurality of layers of material, including a first layer folded to provide a support leg for one of said shelves and a second layer folded to assume an obtuse angle with respect to said bottom, each of said sides being folded to assume an obtuse angle with respect to said bottom and consisting of a plurality of layers of material, one folded inwardly with respect to the other, said inwardly folded layer of said side having a longitudinal edge adjoining said first layer of said end, end flaps on said second layers of said ends folded outside and partially overlapping said sides.

10. A blank for a folding box comprising a single sheet of material and having, a rectangular bottom portion, a pair of opposed end sections, said end sections comprising at least three end portions, and a shelf portion interposed between two of said end portions, said end portions, said shelf portion said bottom portion being separated one from another by transverse score lines, a pair of side sections adjoining opposed edges of said bottom portion and divided therefrom by longitudinal score lines, said side sections comprising at least two side portions divided from one another and from said bottom portion by longitudinal score lines, the innermost of said side portions having outwardly flared longitudinal edges disposed at an angle with respect to said transverse score lines equal to the angle assumed by the outer end portion with respect to the bottom of an assembled box, the outermost of said side portions having outwardly flared longitudinal edges disposed at an angle with respect to said transverse score lines equal to the angle assumed by the innermost of said end portions with respect to the bottom of an assembled box, end flaps associated with one of said end portions and divided therefrom by a score line disposed at an angle with respect to said longitudinal score lines equal to the angle assumed by said side sections with respect to the bottom of an assembled box.

11. A folding box comprising an integral rectangular bottom portion, pair of opposed side portions disposed at an obtuse angle with respect to said bottom portion, and pair of opposed end sections, each of said end sections comprising, a first end portion disposed at an obtuse angle with respect to said bottom portion, a second end portion partially overlying and disposed inwardly with respect to said first end portion, a shelf portion substantially horizontally disposed below the lower edge of said second end portion, and a support leg for said shelf portion, a first end flap connected to said first end portion and folded outside and partially overlapping one of said side portions, and a second end flap connected to said support leg and folded inside and partially overlapping said side portion, one edge of said second end flap being disposed along the inside of said bottom portion, the length of said bottom portion being greater than the distance between the inner edges of said shelf portions in the horizontal plane of said shelf portions and the length and width of said box in said horizontal plane being greater than the length and width, respectively, of said bottom portion.

12. A folding box comprising an integral rectangular bottom portion, pair of opposed side portions disposed at an obtuse angle with respect to said bottom portion, and pair of opposed end sections, each of said end sections comprising, a first end portion disposed at an obtuse angle with respect to said bottom portion, a second end portion partially overlying and disposed inwardly with respect to said first end portion, a shelf portion substantially horizontally disposed above the lower edge of said second end portion, and a support leg for said shelf portion disposed substantially perpendicular to said bottom portion, said support leg being spaced from said first end portion and separate reinforcing means in the space between said support leg and said first end portion, and means integral with said box projecting into said space to hold said reinforcing means in position.

13. A blank for a folding box comprising a single sheet of material and having, a rectangular bottom portion, a pair of opposed end sections for each end of the blank, said end sections comprising, a support portion, a shelf portion which said support portion supports in an assembled box, a first end portion, a second end portion, said bottom portion, said end portions, said shelf portion and said support portion being divided one from another by transverse score lines, a pair of side portions adjoining opposed edges of said bottom and divided therefrom by longitudinal score lines, the longitudinal edges of said side portions being disposed at an angle with respect to said longitudinal score lines equal to the angle said second end portion assumes with respect to said bottom portion of an assembled box, a first flap connected to said second end portion and divided therefrom by a score line disposed at an angle with respect to said transverse score lines equal to the angle assumed by said side portions with respect to said bottom portion in an assembled box, a second flap connected to said support portion and divided therefrom by a score line disposed at an angle with respect to said transverse score lines equal to the angle assumed by said side portions with respect to said bottom portion in an assembled box, said second flap having an outermost edge disposed at an angle with respect to said longitudinal score line equal to the angle assumed by said support portion with respect to said bottom portion in an assembled box.

14. A blank for a folding box comprising a single sheet of material and having, a rectangular bottom portion, a pair of opposed end sections for each end of the blank, said end sections comprising, a support portion, a shelf portion which said support portion supports in an assembled box, a first end portion, a second end portion, said bottom portion, said end portions, said shelf portion and said support portion being divided one from another by transverse score lines, the longitudinal edges of said side portions extending longitudinally outwardly beyond the projection of said transverse score line dividing said bottom portion from said support portion for a distance substantially equal to the longitudinal width of said shelf portion and said longitudinal edges being disposed equal to the angle said second end portion assumes with respect to said bottom portion of an assembled box, a first flap connected to said second end portion and divided therefrom by a score line disposed at an angle with respect to said transverse score lines equal to the angle assumed by said side portions with respect to said bottom portion in an assembled box.

15. A blank for a folding box comprising a single sheet of material and having, a rectangular bottom portion, a pair of opposed end sections for each end of the blank, said end sections comprising, a support portion, a shelf portion which said support portion supports in an assembled box, a first end portion, a second end portion, said bottom portion, said end portions, said shelf portion and said support portion being divided one from another by transverse score lines, the longitudinal edges of said side portions extending longitudinally outwardly beyond the projection of said transverse score line dividing said bottom portion from said support portion for a distance substantially equal to the longitudinal width of said shelf portion and said longitudinal edges being disposed equal to the angle said second end portion assumes with respect to said bottom portion of an assembled box, a first flap connected to said second end portion and divided therefrom by a score line disposed at an angle with respect to said transverse score lines equal to the angle assumed by said side portions with respect to said bottom portion in an assembled box, and a reinforcement retaining ear integral with said bottom portion and extending into the zone of said support portion and cut out from said zone.

16. A blank for a folding box comprising a single sheet of material and having, a rectangular bottom portion, a pair of opposed end sections for each end of the blank, said end sections comprising, a support portion, a shelf portion which said support portion supports in an assembled box, a first end portion, a second end portion, said bottom portion, said end portions, said shelf portion and said support portion being divided one from another by transverse score lines, a pair of side sections adjoining opposed edges of said bottom portion and divided therefrom by longitudinal score lines, said side sections comprising at least two side portions divided from one another and from said bottom portion by longitudinal score lines, the innermost of said side portions having outwardly flared longitudinal edges disposed at an angle with respect to said transverse score lines equal to the angle assumed by the outermost end portion with respect to the bottom of an assembled box, the outermost of said side portions having outwardly flared longitudinal edges disposed at an angle with respect to said transverse score lines equal to the angle assumed by the innermost of said end portions with respect to the bottom of an assembled box, a flap connected to said first end portion and divided therefrom by a score line disposed at an angle with respect to said transverse score lines equal to the angle assumed by said side portions with respect to said bottom portion in an assembled box.

WALLACE A. ADAMS.

REFERENCES CITED

The following references are of record in the file of this patent:

UNITED STATES PATENTS

| Number | Name | Date |
|---|---|---|
| 1,331,009 | Ford | Feb. 17, 1920 |
| 1,725,524 | Kondolf | Aug. 20, 1929 |
| 1,826,197 | Adams | Oct. 6, 1931 |
| 2,056,297 | Rood | Oct. 6, 1936 |
| 2,163,117 | Evans | June 20, 1939 |
| 2,326,926 | Bureau et al. | Aug. 17, 1943 |
| 2,366,602 | De Haven | Jan. 2, 1945 |
| 2,397,934 | Frankenstein | Apr. 9, 1946 |
| 2,451,209 | Frankenstein | Oct. 12, 1948 |
| 2,494,234 | Frankenstein | Jan. 10, 1950 |